US009919689B2

(12) United States Patent
Fletcher et al.

(10) Patent No.: US 9,919,689 B2
(45) Date of Patent: Mar. 20, 2018

(54) BYPASS VALVE IN AN APPARATUS FOR PRODUCING VACUUM

(71) Applicants: David E. Fletcher, Flint, MI (US); Brian M. Graichen, Leonard, MI (US); Keith Hampton, Ann Arbor, MI (US)

(72) Inventors: David E. Fletcher, Flint, MI (US); Brian M. Graichen, Leonard, MI (US); Keith Hampton, Ann Arbor, MI (US)

(73) Assignee: Dayco IP Holdings, LLC, Troy, MI (US)

( * ) Notice: Subject to any disclaimer, the term of this patent is extended or adjusted under 35 U.S.C. 154(b) by 0 days.

(21) Appl. No.: 15/613,641

(22) Filed: Jun. 5, 2017

(65) Prior Publication Data

US 2017/0356404 A1 Dec. 14, 2017

Related U.S. Application Data

(60) Provisional application No. 62/349,787, filed on Jun. 14, 2016.

(51) Int. Cl.
*F16K 11/00* (2006.01)
*B60T 13/52* (2006.01)
*B60T 17/02* (2006.01)

(52) U.S. Cl.
CPC ............. *B60T 13/52* (2013.01); *B60T 17/02* (2013.01); *Y10T 137/87587* (2015.04)

(58) Field of Classification Search
CPC ... B60T 13/52; B60T 17/02; Y10T 137/87587
(Continued)

(56) References Cited

U.S. PATENT DOCUMENTS 1,845,969 A    2/1932  Hueber
2,563,002 A *  8/1951  Bissell .................. B01F 5/0415
                                               137/888
(Continued)

FOREIGN PATENT DOCUMENTS

DE    4310761 A1   10/1994
GB    2129516 A     5/1984

OTHER PUBLICATIONS

EP, Supplementary European Search Report; Patent Application No. 14811266.7; dated Apr. 5, 2017, Applicant Dayco IP Holdings, LLC (5 pages).
(Continued)

*Primary Examiner* — Umashankar Venkatesan
(74) *Attorney, Agent, or Firm* — FisherBroyles, LLP; Susan M. Oiler

(57) ABSTRACT

Venturi devices are disclosed that have a housing defining a conduit having a Venturi gap. Downstream of and bypassing the Venturi gap is a bypass check valve that defines an internal cavity having a first seat, a second seat, an inlet port, at least two outlet ports, and a seal member seated therein that is translatable between a closed position against the first seat and an open position against the second seat. The two outlet ports of the bypass check valve enter the conduit at opposing positions disposed a distance from a top of the conduit, which is located at a midsagittal plane of the housing. Further, a transition from a tapering section downstream of the Venturi gap and upstream of each of the two outlet ports to a discharge section downstream of the two outlet ports forms a gradually, continuously tapering interior surface of the conduit.

17 Claims, 6 Drawing Sheets

(58) Field of Classification Search
USPC .................... 137/891; 417/187, 188, 189
See application file for complete search history.

(56) References Cited

U.S. PATENT DOCUMENTS

| | | | |
|---|---|---|---|
| 3,234,932 A | | 2/1966 | Bird et al. |
| 3,473,481 A | * | 10/1969 | Brane .................. B01F 5/0413 |
| | | | 137/895 |
| 3,702,482 A | * | 11/1972 | Dolcimascolo ........ G03G 13/22 |
| | | | 101/DIG. 37 |
| 3,754,841 A | | 8/1973 | Grabb et al. |
| 4,211,200 A | | 7/1980 | Rocchio et al. |
| 4,499,034 A | | 2/1985 | McAllister, Jr. |
| 4,519,423 A | | 5/1985 | Ho |
| 4,554,786 A | | 11/1985 | Takeuchi et al. |
| 5,108,266 A | | 4/1992 | Hewitt |
| 5,188,141 A | | 2/1993 | Cook et al. |
| 5,291,916 A | | 3/1994 | Kloosterman et al. |
| 5,816,446 A | | 10/1998 | Steindorf |
| 6,035,881 A | | 3/2000 | Emmerich et al. |
| RE37,090 E | | 3/2001 | Kloosterman et al. |
| 6,220,271 B1 | | 4/2001 | Emmerich et al. |
| 7,722,132 B2 | | 5/2010 | Carlsson |
| 7,752,841 B2 | * | 7/2010 | Choi ...................... B60T 17/02 |
| | | | 303/12 |
| 2006/0016477 A1 | | 1/2006 | Zaparackas |
| 2008/0007113 A1 | | 1/2008 | Choi |
| 2008/0121480 A1 | | 5/2008 | Kawamori et al. |
| 2011/0132311 A1 | | 6/2011 | Pursifull et al. |
| 2011/0186151 A1 | | 8/2011 | Sparazynski |
| 2013/0213510 A1 | | 8/2013 | Burnham et al. |
| 2013/0233276 A1 | | 9/2013 | Pursifull et al. |
| 2013/0233287 A1 | | 9/2013 | Leone |
| 2015/0096637 A1 | | 4/2015 | Hampton et al. |
| 2015/0204452 A1 | | 7/2015 | Fletcher et al. |
| 2015/0233393 A1 | * | 8/2015 | Burnham .................. F04F 5/42 |
| | | | 417/189 |
| 2015/0285401 A1 | | 10/2015 | Niedert et al. |
| 2015/0354726 A1 | * | 12/2015 | Fletcher .................. F04F 5/52 |
| | | | 417/189 |

OTHER PUBLICATIONS

CN, Office Action and Search Report with English translation; Chinese Patent Application No. 201410413220. 7; dated Nov. 14, 2016.
PCT, International Search Report and Written Opinion, PCT/US2014/041250, dated Oct. 27, 2014, Applicant Dayco IP Holdings, LLC (9 pages).
International Search Report and Written Opinion issued in PCT/US2017/035911 dated Aug. 24, 2017, Applicant Dayco IP Holdings, LLC (7 pages).

* cited by examiner

BYPASS VALVE IN AN APPARATUS FOR PRODUCING VACUUM

RELATED APPLICATIONS

This Application claims the benefit of U.S. Provisional Application No. 62/349,787, filed Jun. 14, 2016, the entirety of which is incorporated herein by reference.

TECHNICAL FIELD

This application relates to an apparatus that produces vacuum using the Venturi effect, and, more particularly, to an improved bypass port that permits higher volume flow into a discharge area of the apparatus under certain conditions.

BACKGROUND

Engines, for example vehicle engines, are known to include aspirators or ejectors for producing vacuum. Typically, the aspirators are used to generate a vacuum that is lower than engine manifold vacuum by inducing some of the engine air to travel through a Venturi. It is known that the high speed flow of air through a Venturi produces a pressure drop capable of pulling fluid from associated devices requiring a vacuum assist, including, for example, a fuel vapor purging system or a brake boost device. The aspirators may include a check valve between the Venturi and the device requiring vacuum assist to regulate the direction of flow through the aspirator.

It is known to provide a bypass valve in an aspirator for increased flow capacity through the aspirator during certain conditions. For example, it may be desirable to purge or evacuate the fluid from a device attached to the aspirator in a very short amount of time. Although the Venturi tube in the aspirator may generate a significant pressure drop and, therefore, vacuum, the small dimensions of the Venturi may restrict the volume of flow such that the device cannot be purged as quickly as desired. Therefore, a second flow path or bypass is provided in the aspirator to permit higher flow volume from high pressure to low pressure under certain conditions. For example, when the pressure in a device requiring vacuum assist is higher than the outlet pressure of the aspirator, i.e., typically manifold pressure, the bypass valve will open to permit flow through the bypass by virtue of the pressure gradient, regardless of the operation of the Venturi. This flow through the bypass is in addition to the flow through the Venturi which results in a quicker purge of the attached device requiring vacuum assist.

In known aspirators like the one in co-pending Published Application No. US2015/0096637, the port opening through the bypass valve is located in the top of the flow path through which fluid discharges from the Venturi outlet to the aspirator discharge outlet. This location of the port opening is restrictive and limits the size of the bypass port through which fluid flow is possible. In some applications, the flow area through a top bypass port may not be sufficient. Merely increasing the size of the top opening is not an acceptable solution. Therefore, a new aspirator design is needed with an improved bypass valve having greater flow capacity. According to the present invention, one or more bypass ports are provided in the lateral sides of the discharge path, rather than the top. Because of the cross-sectional shape of the discharge path, positioning one or more bypass ports on the lateral sides of the discharge path provides greater flow area for improved operation. In addition, relocation of the bypass port from the top to the lateral sides of the discharge path permits a refinement of the discharge path profile to reduce or eliminate abrupt changes in cross-section that produce separation of flow from the interior wall, an undesirable effect that results in turbulent flow and noise.

SUMMARY

In one aspect, Venturi devices are disclosed that have a housing defining a conduit and within the conduit a Venturi gap. Downstream of and bypassing the Venturi gap is a bypass check valve that defines an internal cavity having a first seat, a second seat, an inlet port, and at least two outlet ports. All the ports of the bypass check valve are in fluid communication with the internal cavity thereof, and a seal member, such as a generally flat disc, is seated within the internal cavity. The seal member is translatable between a closed position against the first seat and an open position against the second seat in response to pressure differentials within the Venturi device without the aid of a biasing member. The two outlet ports of the bypass check valve enter the conduit at opposing positions disposed a distance from a top of the conduit, which is located at a midsagittal plane of the housing. Further, a transition from a tapering section downstream of the Venturi gap and upstream of each of the two outlet ports to a discharge section downstream of the two outlet ports forms a gradually, continuously tapering interior surface of the conduit.

In one embodiment, the two outlet ports are positioned generally perpendicular to the midsagittal plane, the conduit has an exposed length within the internal cavity of the bypass check valve, and the two outlet ports are positioned generally at the midpoint of the exposed length.

In another embodiment, the conduit has an exposed length within the internal cavity of the bypass check valve, and the two outlet ports are generally proximate to a midpoint of the exposed length and enter the conduit downstream of the midpoint.

In all of the above embodiments, the distance from the top of the conduit to the beginning of each of the two outlet ports forms an acute angle relative to the midsagittal plane, each of the two outlet ports extend downward away from the top of the conduit about the interior surface of the conduit, and the two outlet ports meet and join to form one continuous outlet port at the bottom of the conduit, the bottom being opposite the top at the midsagittal plane of the housing.

In all of the above embodiments, each of the two outlet ports includes a recessed flow path in the interior surface of the conduit extending from the outlet port toward a discharge outlet of the conduit. Each of the recessed flow paths can diverge from the outlet port toward the discharge outlet, and is generally parallel to the midsagittal plane.

In all of the above embodiments, each of the two outlet ports have a transverse cross-sectional area of less than the transverse cross-sectional area of a discharge outlet of the conduit.

In all of the above embodiments, one or any combination of the following features is present in the Venturi device: (i) the interior surface of the conduit transitions from an elliptical-shaped, generally rectangular-shaped, or polygonal-shaped discharge inlet to a circular discharge outlet of the conduit, (ii) the second seat is defined by a plurality of fingers extending into the internal cavity of the bypass check valve circumferentially spaced apart about the two outlet ports, (iii) the housing includes a pin extending into the internal cavity, the seal member includes a bore therethrough, and the pin of the housing is received in the bore of the seal member for translation of the seal member along the pin, and (iv) a second check valve controlling fluid flow through a suction port in fluid communication with the Venturi gap.

In another aspect, an internal combustion engine including any of the above Venturi devices for generation of vacuum is disclosed. The Venturi device is connected for fluid communication with a device requiring vacuum, and a motive inlet of the conduit is connected for fluid communication with either a source of boosted pressure or a source of atmospheric pressure engine.

DETAILED DESCRIPTION

Figure 1:
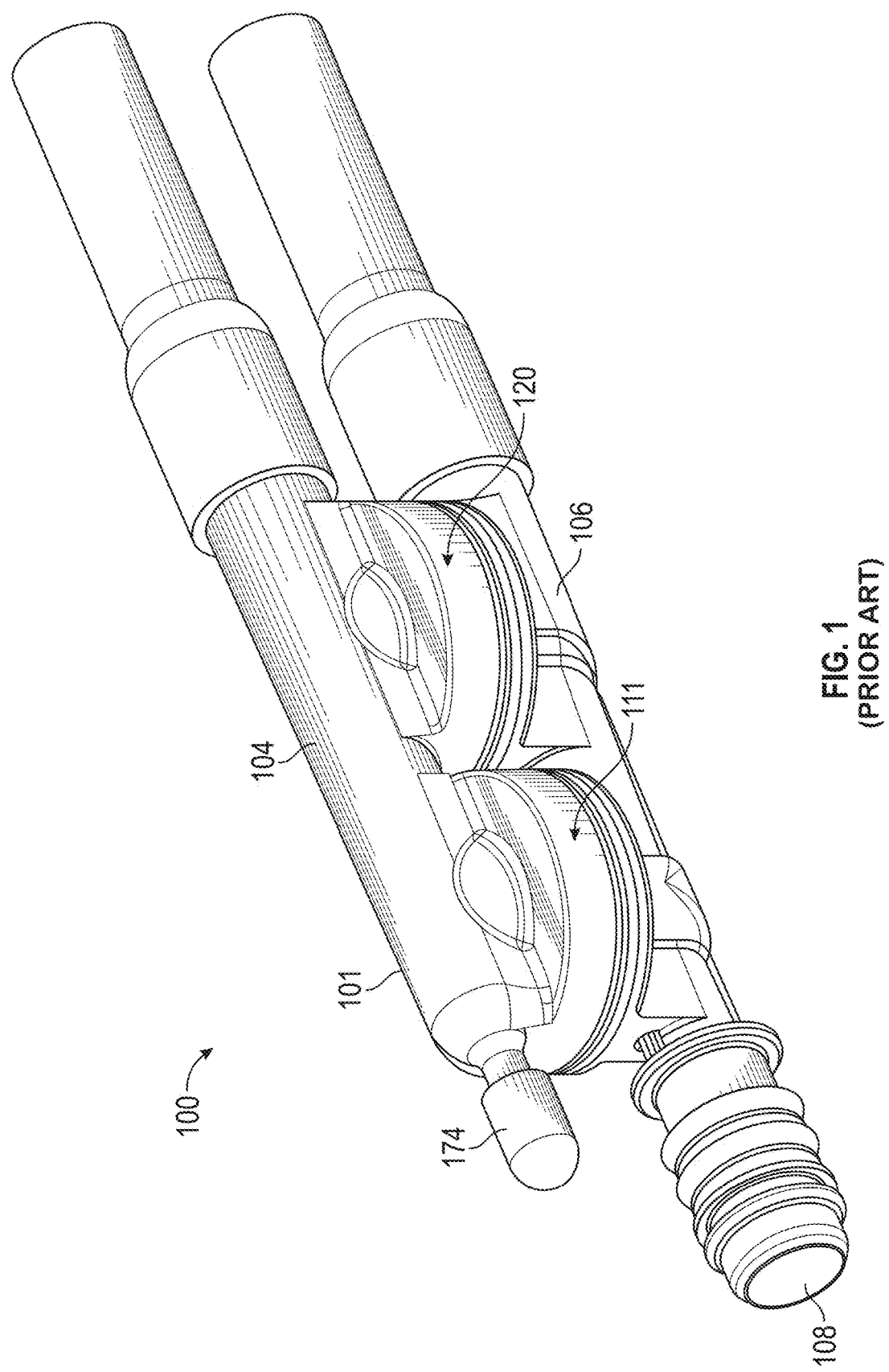
FIG. 1 is a side, perspective view of a known device for producing vacuum.

The following detailed description will illustrate the general principles of the invention, examples of which are additionally illustrated in the accompanying drawings. In the drawings, like reference numbers indicate identical or functionally similar elements.

As used herein, "fluid" means any liquid, suspension, colloid, gas, plasma, or combinations thereof.

FIG. 1 is an external view of a device for producing vacuum of the type disclosed in U.S. Published Application No. 2015/0096637 to Dayco. The device, which is generally identified by reference number 100, is for use in an engine, for example, in a vehicle's engine. The engine may be an internal combustion engine, and the vehicle or engine typically includes a device requiring a vacuum. The engine and all its components and/or subsystems are not shown in the figures, with the exception of a few boxes included to represent specific components of the engine as identified herein, and it is understood that the engine components and/or subsystems may include any commonly found in vehicle engines. These types of devices are referred to as an "aspirator," if it is used with the motive port connected to atmospheric pressure, and an "ejector," if the motive port is connected to boosted pressure from a turbocharger or supercharger, for example.

Figure 2:
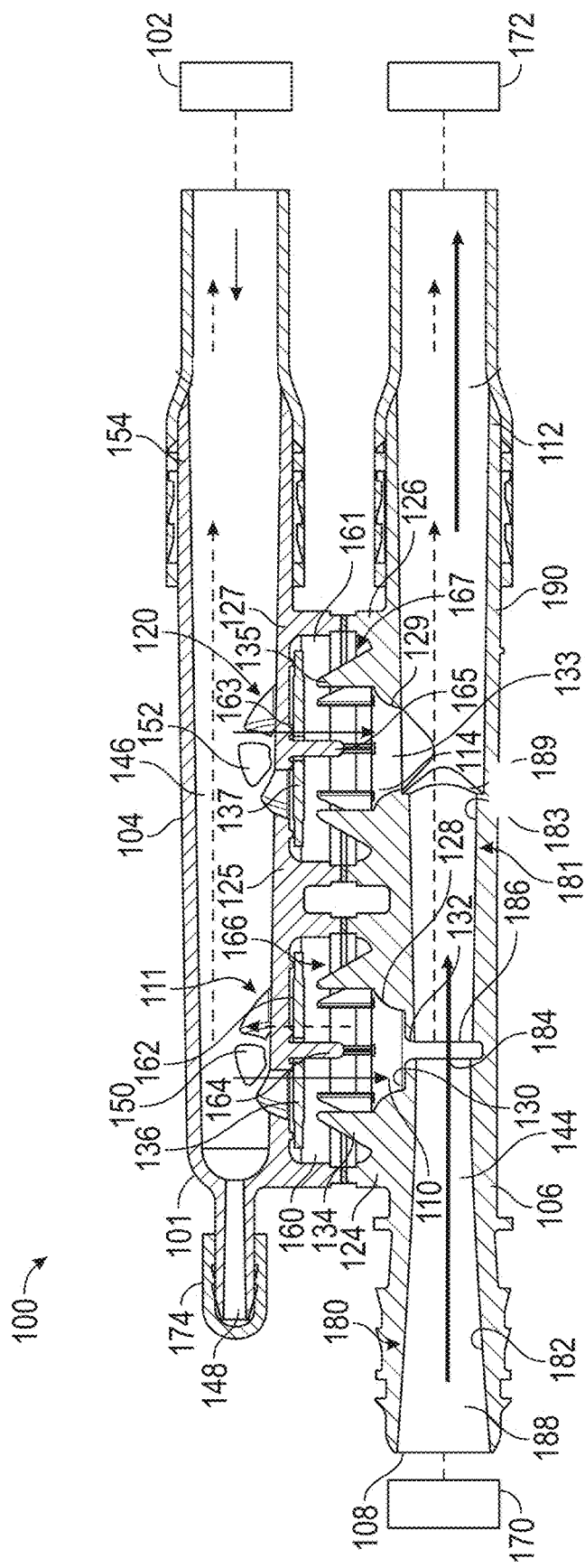
FIG. 2 is a side, longitudinal, cross-sectional view of the device for producing vacuum of FIG. 1.

Referring to FIGS. 1 and 2, the device for producing vacuum 100 is connectable to a device requiring vacuum 102. The device for producing vacuum 100 creates vacuum for said device 102 by the flow of air through a passageway 144 designed to create a Venturi effect. The device for producing vacuum 100 includes a housing 101, which as illustrated is formed of an upper housing portion 104 and a lower housing portion 106. The designations of upper and lower portions are relative to the drawings as oriented on the page, for descriptive purposes, and are not limited to the illustrated orientation when utilized in an engine system. Preferably, upper housing portion 104 is joined to lower housing portion 106 by sonic welding, heating, or other conventional methods for forming an airtight seal therebetween.

The lower housing portion 106 defines passageway 144 that includes a plurality of ports, some of which are connectable to components or subsystems of the engine. The ports include: (1) a motive port 108, which may supply clean air from an engine intake air cleaner 170, typically obtained upstream of the throttle of the engine; (2) a suction port 110, which can connect via a check valve 111 to a device requiring vacuum 102; (3) a discharge port 112, which may be connected to an engine intake manifold 172 downstream of the throttle of the engine; and (4) a bypass port 114. Check valve 111 is preferably arranged to prevent fluid from flowing from the suction port 110 to the application device 102. In one embodiment, the device requiring vacuum 102 is a vehicle brake boost device. The bypass port 114 may be connected to the device requiring vacuum 102 and, optionally, may include a check valve 120 in the fluid flow path therebetween. Check valve 120 is preferably arranged to prevent fluid from flowing from the bypass port 114 to the application device 102.

Figure 3:
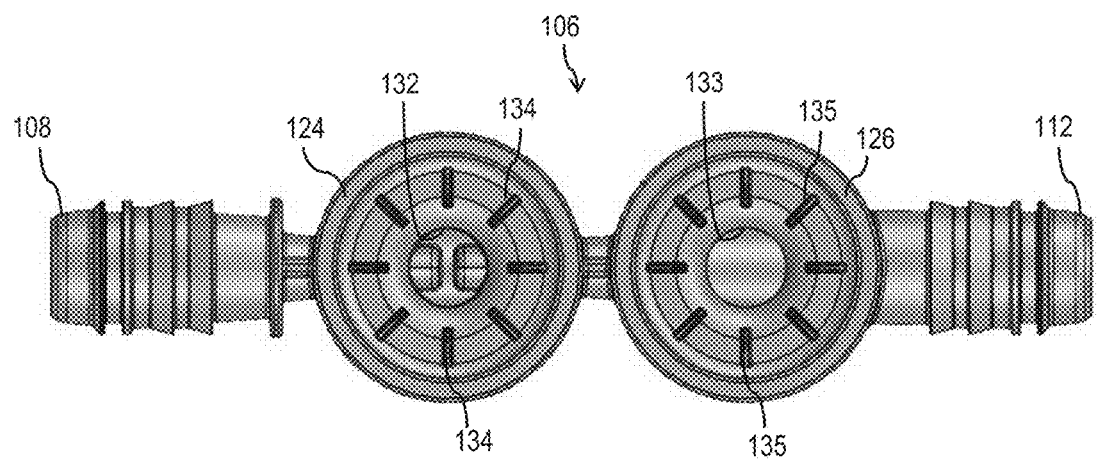
FIG. 3 is a top, plan view of the lower housing portion of the device for producing vacuum of FIG. 1.

As shown in FIGS. 2 and 3, the lower housing portion 106 includes lower valve seats 124, 126. A bore 132, 133 is defined in each lower valve seat 124, 126, respectively, to allow for air flow communication with air passageway 144. Each lower valve seat 124, 126 includes a plurality of radially spaced fingers 134, 135 extending upwardly from an upper surface thereof. The radially spaced fingers 134, 135 serve to support a seal member 136, 137 when the valves open to permit flow. As best seen in FIG. 2, the upper housing portion 104 is configured for mating to or with the lower housing portion 106 to form the check valves 111, 120. Upper housing portion 104 defines passageway 146 extending the length thereof and defines a plurality of ports, some of which are connectable to components or subsystems of the engine. The ports include: (1) a first port 148 that may be capped with cap 174 or may be connected to a component or subsystem of the engine; (2) a second port 150, which is in fluid communication with the suction port 110 in the lower housing portion 106, and between which the seal member 136 is disposed; (3) a third port 152 (part of the inlet port for chamber/cavity 167) in fluid communication with the bypass port 114 in the lower housing portion 106, and between which the seal member 137 is disposed; and (4) a fourth port 154 which may function as an inlet connecting the aspirator-check valve assembly to a device requiring vacuum 102. Each of the respective ports 108, 148, 112, and 154 may include a connector feature on the outer surface thereof for connecting the passageway 144 to hoses or other features in the engine.

As shown in FIG. 2, the upper housing portion 104 includes upper valve seats 125, 127. Each upper valve seat 125, 127 is defined by continuous outer wall 160, 161 and bottom wall 162, 163. Both upper valve seats 125, 127 may include a pin 164, 165 extending downwardly from the bottom walls 162, 163, respectively, toward the lower housing portion 106. The pins 164, 165 function as a guide for translation of the sealing members 136, 137 within the cavities 166, 167 defined by the mated upper valve seat 125 with the lower valve seat 124 and defined by the mated upper valve seat 127 with the lower valve seat 126. Accordingly, each sealing member 136, 137 includes a bore therethrough sized and positioned therein for receipt of the pin 164,165 within its respective cavity 166, 167.

When the device for producing vacuum 100 is connected into an engine system, for example as illustrated in FIG. 2, the check valves 111 and 120 function as follows. As the engine operates, the intake manifold 172 draws air into the motive port 180, through passageway 144 and out the discharge port 112. This creates a partial vacuum in the check valves 111, 120 and passageway 146 to draw seals 136, 137 downward against the plurality of fingers 134, 135. Due to the spacing of fingers 134, 135, fluid flow from passageway 144 to passageway 146 is allowed. The partial vacuum created by the operation of the engine serves in the vacuum assistance of at least the operation of the device requiring vacuum 102.

The air flow system in a typical internal combustion engine operates on the principle that as the engine operates, a partial vacuum is created which pulls air through the air intake port of the carburetor or fuel injector to aid in proper fuel combustion. This vacuum has been found to be useful in supplementing vacuum assist subsystems in the vehicle, particularly brakes, fuel vapor canister purging systems, automatic transmissions and, most recently, air conditioners. The device for producing vacuum 100 may provide a connection between the main airway and the subsystem and serve to inhibit back pressure from the subsystem from disturbing airflow through the main airway.

Figure 4:
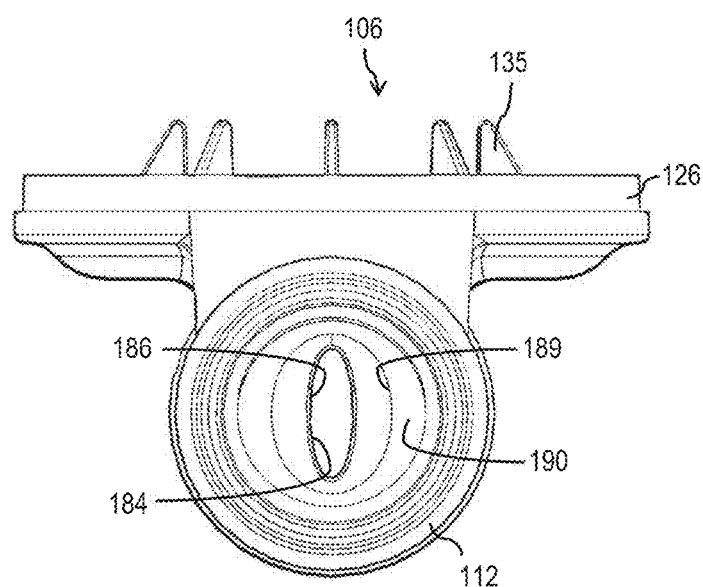
FIG. 4 is an end view of the lower housing portion from the discharge port of the device for producing vacuum of FIG. 1.
Figure 5:
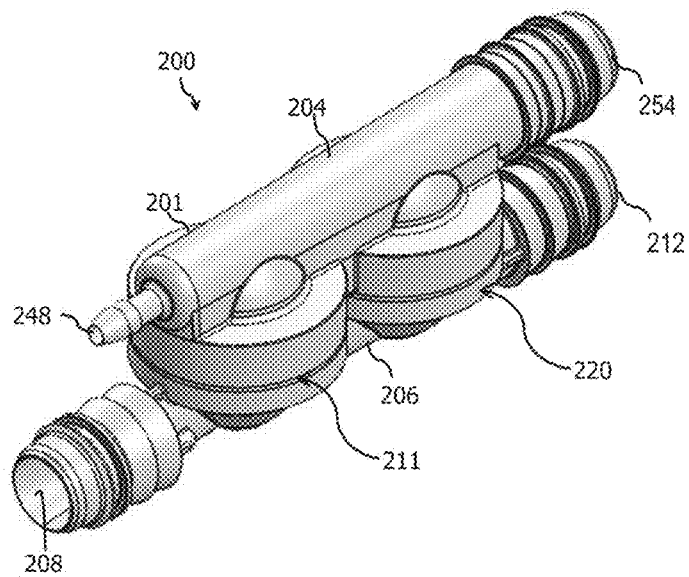
FIG. 5 is a side, perspective view of a first embodiment of a device for producing vacuum.

Referring again to FIGS. 2 and 4, the passageway 144 in the lower housing portion 106 has an inner dimension along a central longitudinal axis that includes a first tapering portion 182 (also referred to herein as the motive cone) in the motive section 180 of the lower housing portion 106 coupled to a second tapering portion 183 (also referred to herein as the discharge cone) in the discharge section 181 of the lower housing portion 106. Here, the first tapering portion 182 and the second tapering portion 183 are aligned end to end (outlet end 184 of the motive section 180 to inlet end 186 of the discharge section 181). The inlet ends 188, 186 and the outlet ends 184, 189 are elliptical in cross section and the gradually, continuously tapering inner dimension extending therebetween (from inlet to outlet) defines a hyperbolic profile.

Still referring to FIG. 2, the second tapering portion 183 tapers gradually, continuously from a smaller dimensioned inlet end 186 to a larger dimensioned outlet end 189. The bypass port 114 may intersect the discharge section 181 adjacent to, but downstream of the outlet end 189. The profile of discharge section 181 in the portion 190 located downstream of the outlet end 189 of the second tapering portion 183 possesses a conical profile with a circular cross section until it terminates at the discharge port 112. The interior surface of the second tapering portion 183 is generally, continuously smooth along its entire length, i.e., the void is generally cylindrical, with the bases of the cylinder being the outlet end 189 and the discharge port 112. This profile is used to provide a larger bypass port 114 than would otherwise be possible if the profile of the second tapering portion 183 was continued until the discharge port 112. Specifically, a top opening, bore 133 in FIG. 3, into the second tapering portion 183 of the passageway 144 of said profile would only provide a small elliptical port without sufficient flow capacity for the performance desired. Changing the profile of portion 190 of the discharge section 181 is not without its drawbacks. The abrupt change of cross section at outlet end 189 results in separation of flow, lower performance, and noise. Moreover, the size of the single, top-opening, bore 133, in passageway 144 is still not sufficient for flow volume desired from the bypass port 114. Accordingly, an improved bypass port is desired that provides greater flow volume without sacrificing performance or requiring an abrupt change of cross section. The improved bypass port is described in detail below.

Figure 6:
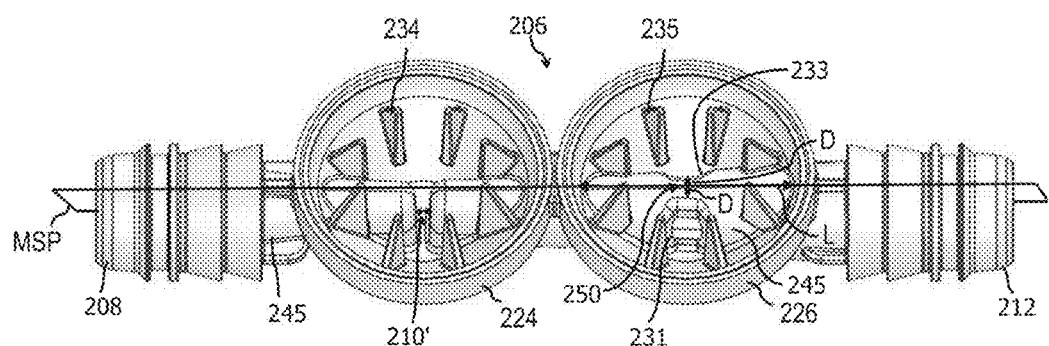
FIG. 6 is a top, perspective view of the lower housing portion of the device for producing vacuum of FIG. 5.
Figure 7:
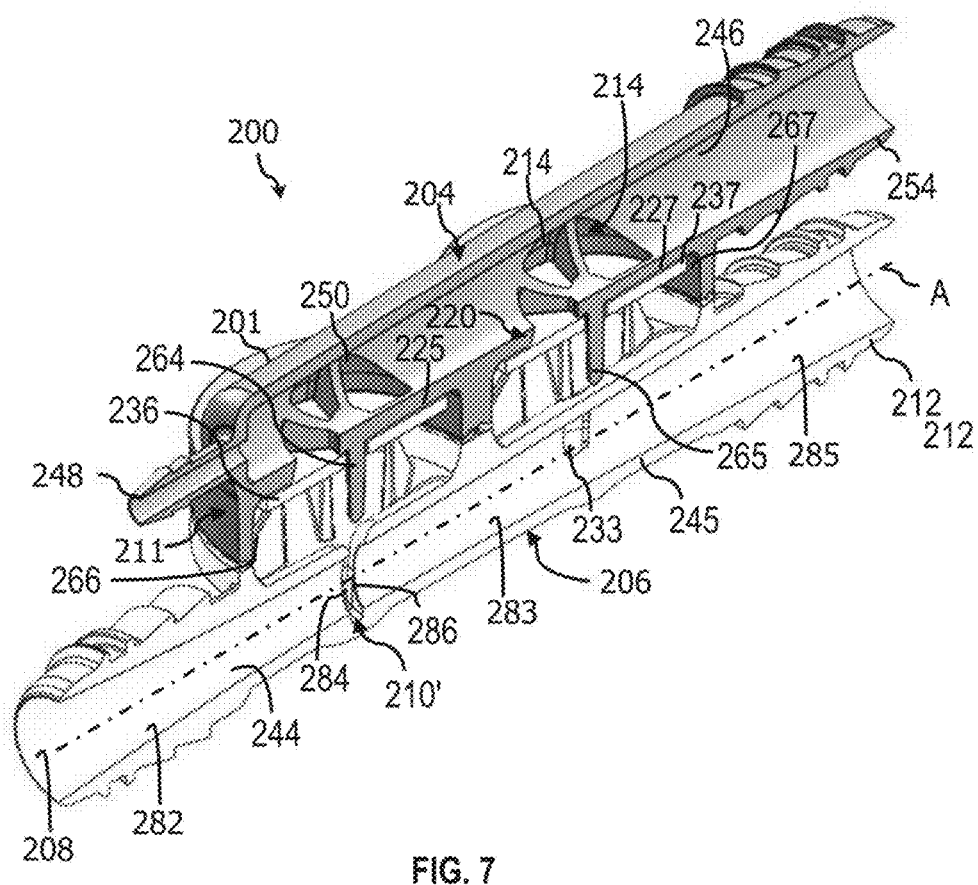
FIG. 7 is a side, perspective, cross-sectional view of the device for producing vacuum of FIG. 5.

Referring now to FIGS. 5 through 8, a new device for producing vacuum 200 is shown that has an improved bypass port 214. Similar to the device for producing vacuum 100 shown in FIGS. 1-4, the new device for producing vacuum 200 includes a housing 201 formed of an upper housing portion 204 and a lower housing portion 206, and functions the same in an engine system. With reference to FIG. 7, the upper housing portion 204 defines a passageway 246. The lower housing portion 206 defines a passageway 244, the interior structure of the conduit 245. The upper housing portion 204 and lower housing portion 206 are mated together to form check valves 211 and 220 that connect the passageways 244 and 246. Each of the upper housing 204 and lower housing 206 and the entire housing 201, when assembled, have a midsagittal plane MSP (labeled in FIG. 6) dividing the device 200 into left and right mirror images.

As best seen in FIG. 7, the upper housing portion 204 defines passageway 246 extending the length thereof and defines a plurality of ports, some of which are connectable to components or subsystems of the engine. The ports include: (1) a first port 248, which may be capped or connected to an engine component; (2) a second port 250, which is in fluid communication with the suction port, which in this embodiment is the entire area surrounding and including the Venturi gap 210', in the lower housing portion 206; (3) a third port 214, which is the inlet port of the bypass check valve 220; and (4) a fourth port 254, which may function as an inlet connecting the device for producing vacuum 200 to a device requiring vacuum assist. Each of the respective ports may include a connector feature on the outer surface thereof for connecting the passageway 244 to hoses or other features in the engine or to the lower housing portion 206. The upper housing portion 204 includes upper valve seats 225, 227. Both upper valve seats 225, 227 may include a pin 264, 265 extending downwardly into the internal cavity toward the lower housing portion 206. The pins 264, 265 function as a guide for translation of the sealing members 236, 237 within the cavities 266, 267 defined by the mated upper valve seat 225 with the lower valve seat 224 and defined by the mated upper valve seat 227 with the lower valve seat 226. Accordingly, each sealing member 236, 237 includes a bore therethrough sized and positioned therein for receipt of the pin 264, 265 within its respective cavity 266, 267.

Referring to FIGS. 6 and 7, the lower housing portion 206 defines a conduit 245 and within the conduit a Venturi gap 210'. The lower housing portion 206 forms a plurality of ports including: (1) motive port 208; (2) the Venturi gap 210' which acts as a suction port; (3) discharge outlet port 212; and (4) at least two bypass outlet ports 231, 233. The lower housing portion 206 includes lower valve seats 224, 226, with the Venturi gap 210' defined in lower valve seat 224, and the at least two outlet ports 231, 233 defined in the lower valve seat 226 to allow for fluid communication with passageway 244. Each lower valve seat 224, 226 includes a plurality of radially spaced fingers 234, 235 extending upwardly from an upper surface thereof. The radially spaced fingers 234, 235 serve to each support a seal member 236, 237 (FIG. 7) when the valves open to permit flow. The lower valve seat 226 forms part of a bypass check valve 220 that is disposed downstream of and bypasses the Venturi gap 210'. The at least two outlet ports 231, 233 enter the conduit 245 at opposing positions disposed a distance D (labeled in FIG. 6) from a top 250 of the conduit 245, and the top 250 of the conduit 245 is located at the midsagittal plane MSP of the housing 201 (or of the lower housing section 206, which are the same midsagittal plane). The conduit 245 has a generally smooth transition from a second tapering section 283 downstream of the Venturi gap 210' and upstream of each of the two outlet ports 231, 233 to a discharge section 285 downstream of the two outlet ports 231, 233. i.e., the transition defines a gradually, continuously tapering interior surface for the conduit 245.

Figure 8:
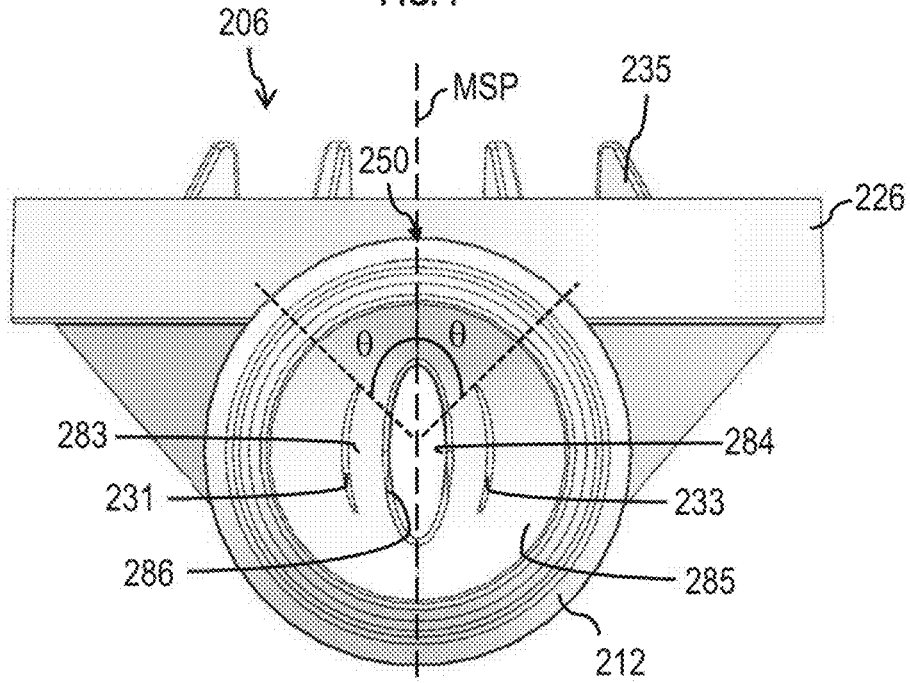
FIG. 8 is an end view of the lower housing portion from the discharge port of the device for producing vacuum of FIG. 6.

The passageway 244 of conduit 245 has an inner dimension along a central longitudinal axis A that includes a first tapering portion 282 (also referred to herein as the motive cone) coupled to the second tapering portion 283 (also referred to herein as the discharge cone). Here, the first tapering portion 282 and the second tapering portion 283 are aligned end to end (outlet end 284 of the motive cone 282 to inlet end 286 of the discharge cone 283). As illustrated in FIG. 8, at least the outlet end 284 and the inlet end 286 are elliptical in cross section and the gradually, continuously tapering inner dimension extending therebetween (from inlet to outlet) defines a hyperbolic profile. The second tapering portion 283 tapers gradually, continuously from a smaller dimensioned inlet end 286 to a larger dimensioned discharge outlet 212, with the at least two bypass ports 231, 233 positioned at any location therebetween. The internal cross section of one or both of the inlet end 286 preferably has an elliptical-shape, but may be a generally, rectangular-shape, or any other polygonal-shape as taught in co-pending U.S. application Ser. No. 14/294,727. The internal cross section of the discharge outlet 212 is preferably circular. The profile of at least a portion of the interior surface of the conduit 245 located downstream of the at least two bypass ports 231, 233 possesses a conical profile with a circular cross section until it terminates at the discharge port 212.

Figure 9:
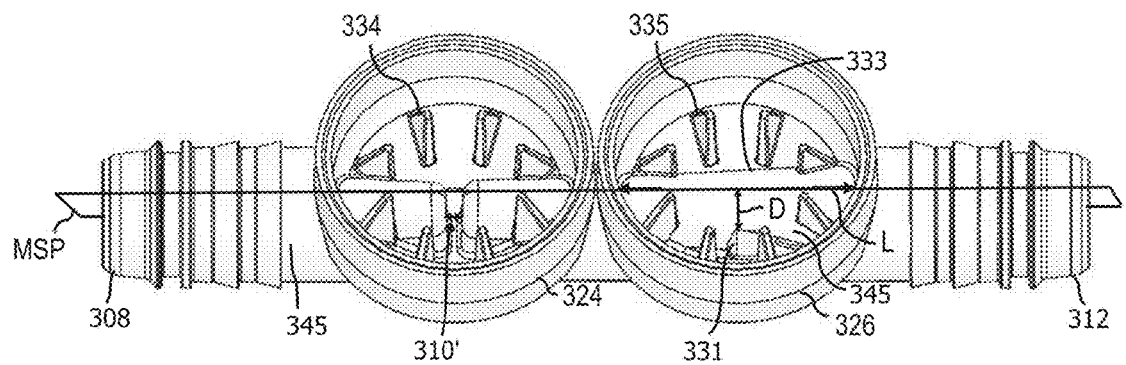
FIG. 9 is a top, perspective view of a lower housing portion of a second embodiment of a device for producing vacuum.
Figure 10:
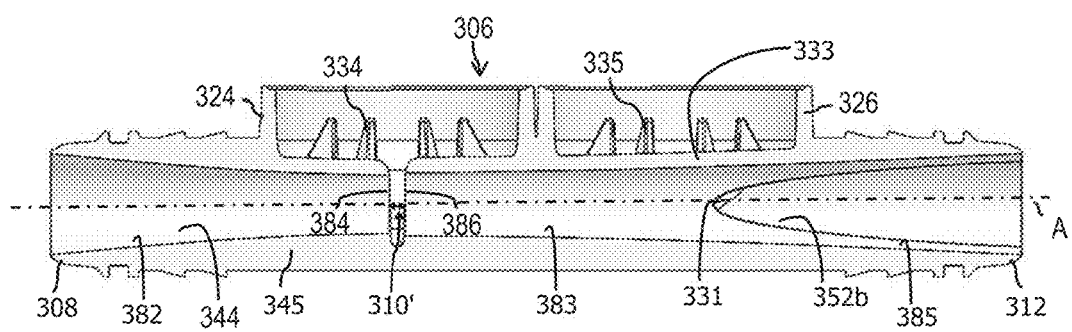
FIG. 10 is a plan, longitudinal, cross-sectional view of the lower housing portion of the device for producing vacuum of FIG. 9.

Referring to FIGS. 6-8, the two outlet ports 231, 233 are positioned generally perpendicular to the midsagittal plane MSP and, as described above, enter the conduit 245 at opposing positions disposed a distance D from a top 250 of the conduit 245. As best shown in FIG. 6, the conduit 245 has an exposed length L within the internal cavity 267 of the bypass check valve 220, and the two outlet ports 231, 233 are positioned generally at the midpoint of the exposed length L. In one embodiment, the two outlet ports 231, 233 are positioned (begin) generally, proximate to the midpoint of the exposed length L, but enter the conduit 245 downstream of the midpoint as seen in FIGS. 9 and 10, with reference to a device for producing vacuum 300. The distance from the top of the conduit 250 to the beginning of each of the two outlet ports 231, 233 forms an acute angle θ relative to the midsagittal plane MSP as shown in FIG. 8. Each of the two outlet ports 231, 233 extend downward away from the top 250 of the conduit 245 about the interior surface of the conduit 245.

Figure 11:
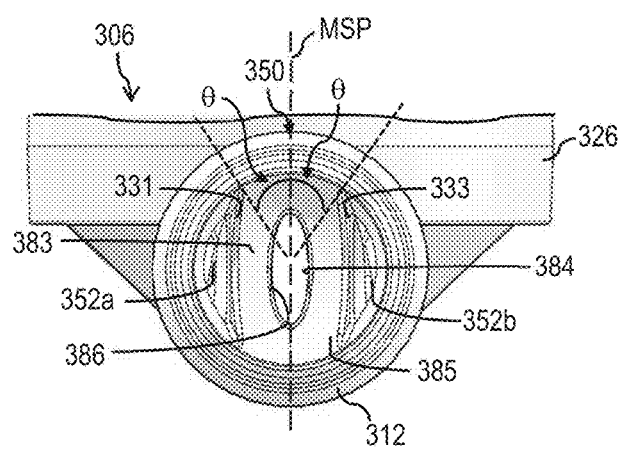
FIG. 11 is an end view of the lower housing portion from the discharge port of the device for producing vacuum of FIG. 9.

Turning now to FIGS. 9-11, a second embodiment of a device for producing vacuum 300 is shown that has an improved bypass port. Similar to the device for producing vacuum 200, specifically, FIG. 5, the device 300 will appear externally the same, having a housing 201 formed of an upper housing portion 204 and a lower housing portion, designated as 306, because the interior is different from that in FIGS. 6-8. The device 300 functions the same in an engine system as disclosed above. With reference to FIG. 10, the lower housing portion 306 defines a passageway 344, the interior structure of the conduit 245. Each of the upper housing 204 and lower housing 306 and the entire housing 201, when assembled, have a midsagittal plane MSP (labeled in FIG. 9) dividing the device 300 into left and right mirror images.

Still referring to FIGS. 9-11, the lower housing portion 306 defines a conduit 345 and within the conduit a Venturi gap 310'. The lower housing portion 306 forms a plurality of ports including: (1) motive port 308; (2) the Venturi gap 310' which acts as a suction port; (3) discharge outlet port 312; and (4) at least two bypass outlet ports 331, 333. The lower housing portion 306 includes lower valve seats 324, 326, with the Venturi gap 310' defined in lower valve seat 324, and the at least two outlet ports 331, 333 defined in the lower valve seat 326 to allow for fluid communication with passageway 344. Each lower valve seat 324, 326 includes a plurality of radially spaced fingers 334, 335 extending upwardly from an upper surface thereof. The radially spaced fingers 334, 335 serve to each support a seal member 236, 237 (shown in FIG. 7) when the valves open to permit flow. The lower valve seat 326 forms part of a bypass check valve 220 that is disposed downstream of and bypasses the Venturi gap 310'. The at least two outlet ports 331, 333 enter the conduit 345 at opposing positions disposed a distance D (labeled in FIG. 9) from a top 350 of the conduit 345, and the top 350 of the conduit 345 is located at the midsagittal plane MSP of the housing 201 (or of the lower housing section 306, which are the same midsagittal plane). The conduit 345 has a generally smooth transition from a second tapering section 383 downstream of the Venturi gap 310' and upstream of each of the two outlet ports 331, 333 to a discharge section 385 downstream of the two outlet ports 331, 333. i.e., the transition defines a gradually, continuously tapering interior surface for the conduit 345.

The passageway 344 of conduit 345 has an inner dimension along a central longitudinal axis A that includes a first tapering portion 382 (also referred to herein as the motive cone) coupled to the second tapering portion 383 (also referred to herein as the discharge cone). Here, the first tapering portion 382 and the second tapering portion 383 are aligned end to end (outlet end 384 of the motive cone 382 to inlet end 386 of the discharge cone 383). As illustrated in FIG. 11, at least the outlet end 384 and the inlet end 386 are elliptical in cross section and the gradually, continuously tapering inner dimension extending therebetween (from inlet to outlet) defines a hyperbolic profile. The second tapering portion 383 tapers gradually, continuously from a smaller dimensioned inlet end 386 to a larger dimensioned discharge outlet 312, with the at least two bypass ports 331, 333 positioned at any location therebetween. The internal cross section of one or both of the outlet end 384 and the inlet end 386 is preferably an elliptical-shape, but may be a generally, rectangular-shaped, or any other polygonal-shape as taught in co-pending U.S. application Ser. No. 14/294, 727. The internal cross section of the discharge outlet 312 is preferably circular. The profile of at least a portion of the interior surface of the conduit 345 located downstream of the at least two bypass ports 331, 333 has a conical profile with a circular cross section until it terminates at the discharge port 312.

The two outlet ports 331, 333 are positioned generally perpendicular to the midsagittal plane MSP and, as described above, enter the conduit 345 at opposing positions disposed a distance D from a top 350 of the conduit 345. As best shown in FIG. 9, the conduit 345 has an exposed length L within the internal cavity of the lower valve seat 326, and the two outlet ports 331, 333 are positioned generally at the midpoint of the exposed length L. Here, the two outlet ports 331, 333 are positioned (begin) generally, proximate to the midpoint of the exposed length L, but enter the conduit 345 downstream of the midpoint as best seen in FIG. 10. The distance from the top of the conduit 350 to the beginning of each of the two outlet ports 331, 333 forms an acute angle θ relative to the midsagittal plane MSP as shown in FIG. 11. Each of the two outlet ports 331, 333 extend downward away from the top 350 of the conduit 345 at an angle toward the discharge outlet 312. In this embodiment, each of the two outlet ports 331, 333 include a recessed flow path 352, labeled as 352a and 352b in FIG. 11. Each recessed flow path 352a, 352b is in the interior surface of the conduit 345 and extends from the outlet port toward the discharge outlet 312. In the illustrated embodiment, each recessed flow path 352a, 352b diverges from the outlet port 331, 333, respectively, toward the discharge outlet 312, but is not limited thereto. Also, each of the recessed flow paths 352 is generally parallel to the midsagittal plane MSP.

In each of the embodiments disclosed herein, each of the two outlet ports 231, 233 and 331, 333 may have a transverse cross-sectional area that is less than the transverse cross-sectional area of the discharge outlet 212, 312 of the conduit. Also, the two outlet ports 231, 233 and 331, 333 may meet at the bottom of the conduit 245, 345, the bottom being opposite the top 250, 350 at the midsagittal plane MSP of the housing 201, to form one continuous outlet port.

Each of the various embodiments herein provide a device for producing vacuum that has an improved bypass port that is less prone to recirculation of the fluid flowing through the device and a pressure drop resulting therefrom, which if allowed to occur reduces flow through the bypass.

Having described the invention in detail and by reference to preferred embodiments thereof, it will be apparent that modifications and variations are possible without departing from the scope of the invention which is defined in the appended claims.

What is claimed:

1. A Venturi device comprising:
a housing defining a conduit and within the conduit a Venturi gap; and
a bypass check valve disposed downstream of and bypassing the Venturi gap;
wherein the bypass check valve defines an internal cavity having a first seat, a second seat, an inlet port, at least two outlet ports, all the ports being in fluid communication with the internal cavity, and a seal member within the internal cavity, the seal member being translatable between a closed position against the first seat and an open position against the second seat;
wherein the two outlet ports enter the conduit at opposing positions disposed a distance from a top of the conduit, the top of the conduit being located at a midsagittal plane of the housing, and a transition from a tapering section downstream of the Venturi gap and upstream of each of the two outlet ports to a discharge section downstream of the two outlet ports forms a gradually, continuously tapering interior surface of the conduit.

2. The Venturi device of claim 1, wherein the two outlet ports are positioned generally perpendicular to the midsagittal plane.

3. The Venturi device of claim 2, wherein the conduit has an exposed length within the internal cavity of the bypass check valve, and the two outlet ports are positioned generally at the midpoint of the exposed length.

4. The Venturi device of claim 1, wherein the conduit has an exposed length within the internal cavity of the bypass check valve, and the two outlet ports are generally proximate to a midpoint of the exposed length and enter the conduit downstream of the midpoint.

5. The Venturi device of claim 1, wherein the distance from the top of the conduit to the beginning of each of the two outlet ports forms an acute angle relative to the midsagittal plane.

6. The Venturi device of claim 5, wherein each of the two outlet ports extend downward away from the top of the conduit about the interior surface of the conduit.

7. The Venturi device of claim 5, wherein the two outlet ports meet and join to form one continuous outlet port at the bottom of the conduit, the bottom being opposite the top at the midsagittal plane of the housing.

8. The Venturi device of claim 1, wherein each of the two outlet ports includes a recessed flow path in the interior surface of the conduit extending from the outlet port toward a discharge outlet of the conduit.

9. The Venturi device of claim 8, wherein each recessed flow path diverges from the outlet port toward the discharge outlet.

10. The Venturi device of claim 8, wherein each recessed flow path is generally parallel to the midsagittal plane.

11. The Venturi device of claim 1, wherein each of the two outlet ports have a transverse cross-sectional area of less than the transverse cross-sectional area of a discharge outlet of the conduit.

12. The Venturi device of claim 1, wherein the interior surface of the conduit transitions from an elliptical-shaped, generally rectangular-shaped, or polygonal-shaped discharge inlet to a circular discharge outlet of the conduit.

13. The Venturi device of claim 1, wherein the second seat is defined by a plurality of fingers extending into the internal cavity of the bypass check valve circumferentially spaced apart about the two outlet ports.

14. The Venturi device of claim 1, wherein the housing includes a pin extending into the internal cavity, the seal member includes a bore therethrough, and the pin of the housing is received in the bore of the seal member for translation of the seal member along the pin.

15. The Venturi device of claim 1, further comprising a second check valve controlling fluid flow through a suction port in fluid communication with the Venturi gap.

16. An internal combustion engine comprising a Venturi device of claim 1.

17. The internal combustion engine of claim 16, wherein the Venturi device is connected for fluid communication with a device requiring vacuum and a motive inlet of the conduit is connected for fluid communication with either a source of boosted pressure or a source of atmospheric pressure engine.

* * * * *